(12) United States Patent
Nakanishi

(10) Patent No.: US 11,675,143 B2
(45) Date of Patent: Jun. 13, 2023

(54) OPTICAL CONNECTION COMPONENT

(71) Applicant: SUMITOMO ELECTRIC INDUSTRIES, LTD., Osaka (JP)

(72) Inventor: Tetsuya Nakanishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/398,044

(22) Filed: Aug. 10, 2021

(65) Prior Publication Data

US 2022/0066106 A1 Mar. 3, 2022

(30) Foreign Application Priority Data

Aug. 25, 2020 (JP) .............................. 2020-003620 U

(51) Int. Cl.
*G02B 6/40* (2006.01)
*G02B 6/36* (2006.01)
*G02B 6/38* (2006.01)
*G02B 6/02* (2006.01)

(52) U.S. Cl.
CPC ......... *G02B 6/403* (2013.01); *G02B 6/02395* (2013.01); *G02B 6/3644* (2013.01); *G02B 6/3861* (2013.01)

(58) Field of Classification Search
None
See application file for complete search history.

(56) References Cited

U.S. PATENT DOCUMENTS

| | | | | |
|---|---|---|---|---|
| 2017/0003446 | A1* | 1/2017 | Homma | C03C 25/1065 |
| 2019/0391333 | A1* | 12/2019 | Nakahara | G02B 6/4242 |
| 2021/0255402 | A1* | 8/2021 | Sutherland | G02B 6/3853 |

FOREIGN PATENT DOCUMENTS

| | | | |
|---|---|---|---|
| JP | 09258064 A | * | 10/1997 |
| JP | 2001242350 A | * | 9/2001 |
| JP | 2002023007 A | * | 1/2002 |
| JP | 2002-139647 A | | 5/2002 |
| JP | 2003-107285 A | | 4/2003 |

OTHER PUBLICATIONS

Kato et al., machine translation of JP 09258064 A, dated Oct. 1997. (Year: 1997).*
Harima et al., machine translation of JP 2002-023007 A, dated Jan. 2002. (Year: 2002).*
Ide et al., machine translation of JP 2001-242350 A, dated Sep. 2001. (Year: 2001).*

* cited by examiner

*Primary Examiner* — Michelle R Connelly
(74) *Attorney, Agent, or Firm* — Oliff PLC

(57) ABSTRACT

An optical connection component includes a plurality of optical fibers and a capillary. Each of the optical fibers includes a glass fiber and a resin coating covering the glass fiber. Each of the optical fibers is provided with a coated portion where the glass fiber is covered with the resin coating, and a coating removed portion where the glass fiber is exposed from the resin coating. The coating removed portion is located closer to an end face of the optical fiber than the coated portion. The glass fiber has an outer diameter of less than 124 μm. The capillary has a first end face and a second end face opposing to each other, and a plurality of holes having an opening at the first end face and extending towards the second end face. The holes respectively receive the coating removed portions of the optical fibers.

16 Claims, 13 Drawing Sheets

OPTICAL CONNECTION COMPONENT

CROSS-REFERENCE TO RELATED APPLICATIONS

This application is based upon and claims the benefit of priority from Japanese Utility Model Registration Application No. 2020-003620, filed on Aug. 25, 2020, the entire contents of which are incorporated herein by reference.

TECHNICAL FIELD

The present disclosure relates to optical connection components.

BACKGROUND

JP2002-139647A discloses one example of a multi-hole ferrule. This multi-hole ferrule includes a capillary provided with a plurality of through holes into which optical fibers are inserted, and a sleeve for holding the capillary. JP2003-107285A discloses another example of a multi-hole ferrule.

SUMMARY

An optical connection component of the present disclosure includes a plurality of optical fibers and a capillary. Each of the optical fibers includes a glass fiber and a resin coating that covers the glass fiber. In addition, each of the optical fibers is provided with a coated portion where the glass fiber is covered with the resin coating, and a coating removed portion where the glass fiber is exposed from the resin coating. The coating removed portion is located closer to an end face of each of the optical fibers than the coated portion. The glass fiber of each of the optical fibers has an outer diameter of less than 124 µm. The capillary has a first end face and a second end face opposing to each other, and a plurality of holes each having an opening at the first end face and extending towards the second end face. Each of the holes receives the coating removed portion of each of the optical fibers.

DETAILED DESCRIPTION

Figure 1:
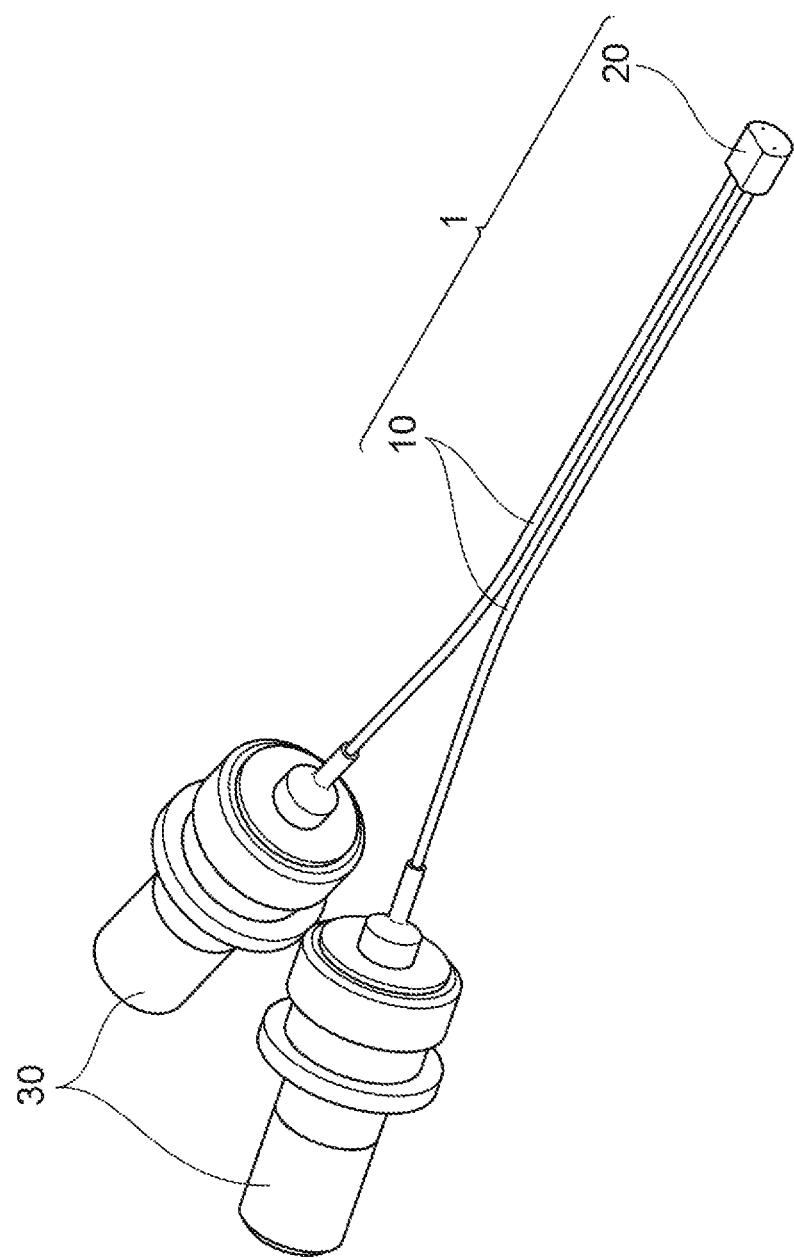
FIG. 1 is a perspective view showing an optical connection component according to an embodiment.

Problems to be Solved by the Present Disclosure

When an optical signal from an optical integrated circuit is transmitted to another device, an optical connection component including a plurality of optical fibers and a capillary holding end portions of the plurality of optical fibers may be used to connect the optical integrated circuit to another device. Each optical fiber has a coated portion in which the periphery of the glass fiber is coated with a resin and a coating removed portion in which the periphery of the glass fiber is not coated with the resin. Further, the capillary has through holes similar to capillary described in JP2002-139647A, and the coating removed portions of the optical fibers are inserted into the through holes. By connecting the capillary to the optical integrated circuit, the plurality of optical fibers is collectively connected to the optical integrated circuit. An end portion of each optical fiber that is not connected to the optical integrated circuit is connected to another device via a receptacle and an optical connector.

When the capillary is connected to the optical integrated circuit, a part of each optical fiber may be bent according to a position where the optical integrated circuit is disposed or a space near the optical integrated circuit. At this time, if the optical fiber is bent excessively, the glass fiber may be broken by stress. Therefore, depending on the arrangement position of the optical integrated circuit or the surrounding space, the capillary may not be connected to the optical integrated circuit. That is, the installation mode of the optical connection component is limited.

Effects of the Present Disclosure

According to the present disclosure, the optical fiber has the glass fiber having the outer diameter that is smaller than an outer diameter of a cladding of a standard optical fiber. As a result, since the stress generated in the glass fiber when the optical fiber is bent is reduced, it is possible to provide an optical connection component in which a damage to the glass fiber is suppressed even when the optical fiber is largely bent.

Details of Embodiments of the Present Disclosure

Specific examples of optical connection components according to the present disclosure are described below with reference to the drawings. The present disclosure is not limited to these examples, but is defined by the scope of the claims, and is intended to include all modifications within the meaning and scope equivalent to the scope of the claims. In the description of the drawings, the same elements are denoted by the same reference numerals, and redundant description will be omitted.

FIG. 1 is a perspective view of an optical connection component 1 according to an embodiment. Optical connection component 1 is used when an optical integrated circuit is optically connected to another optical device. Optical connection component 1 includes a plurality of optical fibers 10 and a capillary 20. In the present embodiment, the number of optical fibers 10 is two in total as an example, but the number of optical fibers 10 is not limited thereto and may be three or more. Capillary 20 is attached to one end of the optical fibers 10. Capillary 20 collectively holds the end portions of the optical fibers 10. Capillary 20 is connected to the optical integrated circuit.

A receptacle 30 for receiving an external optical connector is attached to an end portion of each optical fiber 10 on the side where capillary 20 is not attached. The external optical connector may be an LC connector. The external optical connector is connected to an external optical device via optical fiber 10. In this case, an optical signal transmitted from the optical integrated circuit connected to capillary 20 passes through optical fiber 10, and is transmitted to the external optical device which is optically connected to receptacle 30.

Figure 2:
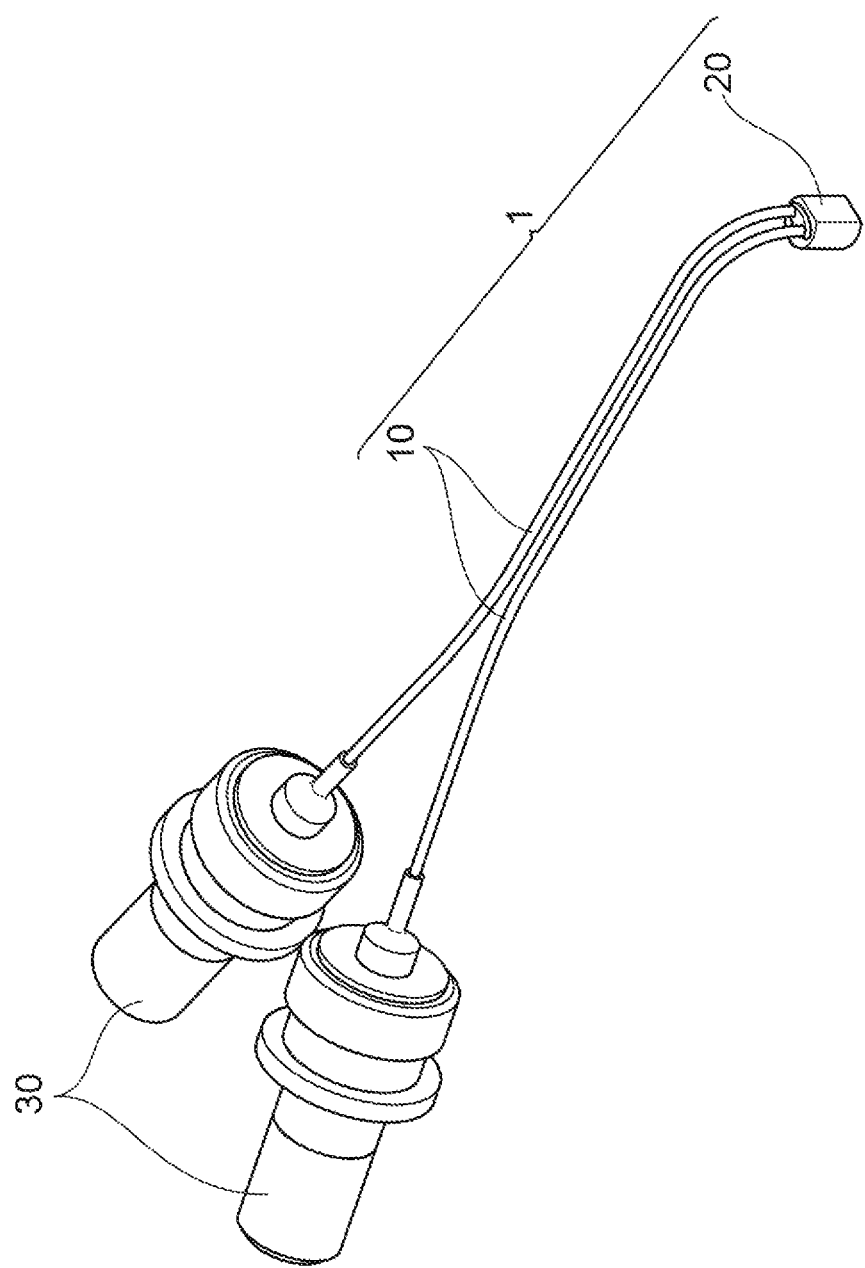
FIG. 2 is a perspective view showing the optical connection component of FIG. 1 when optical fibers are bent.

FIG. 2 is a perspective view of optical connection component 1 when optical fibers 10 are bent. Optical connection component 1 can be used by bending optical fibers 10. FIG. 2 shows an example in which end portions of optical fibers 10 to which capillary 20 is attached are bent. Optical fibers 10 can also be bent at any portion, such as the central portion of optical fiber 10 or an end portion to which receptacle 30 is attached. Optical connection component 1 can be used by bending optical fibers 10 according to the position where optical connection component 1 is arranged and the situation of the surrounding space.

Figure 3:
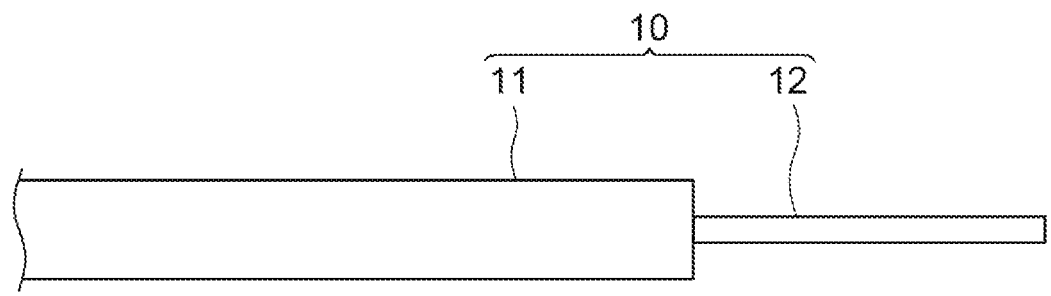
FIG. 3 is a side view showing an end portion of an optical fiber included in the optical connection component of FIG. 1.

FIG. 3 is a side view showing an end portion of each optical fiber 10 included in optical connection component 1. Optical fiber 10 is a member that transmits an optical signal. Optical fiber 10 may be a single-mode optical fiber. Optical fiber 10 is provided with a coated portion 11 and a coating removed portion 12. The coating removed portion 12 is located closer to the distal end side of optical fiber 10 than coated portion 11.

Coated portion 11 is a portion including a glass fiber and a resin coating that covers the glass fiber. The glass fiber is a member for transmitting an optical signal and includes a core and a cladding surrounding the core. The core and the cladding are made of, for example, pure silica glass ($SiO_2$) or silica glass doped with germanium or fluorine. The resin coating covers the outer periphery of the glass fiber to protect the glass fiber. The resin coating is in close contact with a surface of the glass fiber. The resin coating is made of, for example, an ultraviolet cured resin.

Coating removed portion 12 is a portion where the resin coating is peeled and removed from the surface of the glass fiber. In coating removed portion 12, the surface of the glass fiber (the surface of the cladding) is exposed from the resin coating.

The glass fiber has a thickness capable of bending optical fiber 10. Specifically, an outer diameter of the glass fiber is less than 124 μm. The outer diameter of the glass fiber may be equal to or less than 85 μm. As the glass fiber is thinner, a stress generated when optical fiber 10 is bent becomes smaller, so that optical fiber 10 can be easily bent. A bending loss of optical fiber 10, which is an incremental loss in wavelength of 1310 nm when optical fiber 10 is bent by 90 degrees at a bending radius of 2 mm, may be 0.2 dB or less.

Figure 4:
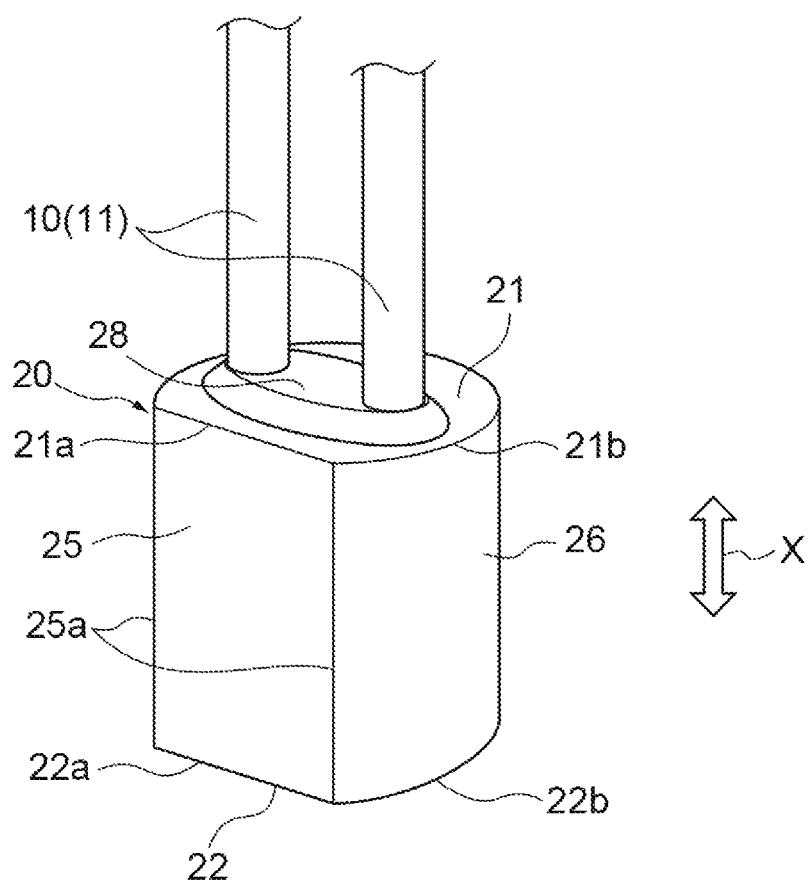
FIG. 4 is a perspective view showing an end portion of the optical connection component of FIG. 1.

FIG. 4 is a perspective view showing an end portion of optical connection component 1. Capillary 20 is a substantially cylindrical member and holds the end portions of the optical fibers 10. Capillary 20 is made of a material which has an ultraviolet-transmitting property. Specifically, the material of capillary 20 may be pure silica glass or boron doped glass. The ultraviolet transmittance of capillary 20 may be 10% or more. Capillary 20 includes a first end face 21, a second end face 22, a pair of receiving holes 23, a plane 25, and a cylindrical surface 26.

First end face 21 is a flat end face provided at the end portion of capillary 20. First end face 21 extends in a direction intersecting (in the present embodiment, orthogonal to) an optical axis direction (direction X) of the end portions of optical fibers 10 received in capillary 20. An outer edge of first end face 21 is defined by a chord 21a and an arc 21b. Both ends of arc 21b are connected to both ends of chord 21a, respectively. Arc 21b is an arc larger than the circumference of a semicircle. First end face 21 is provided with openings (not shown) of the pair of receiving holes 23 described later.

Plane 25 is a surface connecting first end face 21 and second end face 22, and constitutes a side surface of capillary 20 together with cylindrical surface 26. Plane 25 has a rectangular shape having a pair of long side 25a along the direction X. Plane 25 is connected to cylindrical surface 26 at each long side 25a. An end of plane 25 on first end face 21 side is connected to first end face 21 at chord 21a of first end face 21. On the other hand, an end of plane 25 on second end face 22 side is connected to second end face 22 at a chord 22a of second end face 22.

Cylindrical surface 26 is a surface connecting first end face 21 and second end face 22, and constitutes the side surface of capillary 20 together with plane 25. Cylindrical surface 26 is provided so as to surround optical fibers 10 received in capillary 20. An end of cylindrical surface 26 on first end face 21 side is connected to first end face 21 at arc 21b of first end face 21. An end of cylindrical surface 26 on second end face 22 side is connected to second end face 22 at an arc 22b of second end face 22.

Since the side surface of capillary 20 has surfaces of different shapes, that is, plane 25 and cylindrical surface 26, it is possible to confirm an orientation of capillary 20 in the azimuth around a central axis along which optical fibers 10 are received. In other words, it is possible to confirm a direction of capillary 20 in a virtual plane perpendicular to the central axis. That is, plane 25 serves as an angle indicating portion indicating the direction of capillary 20. The surface functioning as the angle indicating portion is not limited to plane 25, and may be a surface having a shape that can be identified as a surface different from cylindrical surface 26. For example, cylindrical surface having a curvature different from that of cylindrical surface 26 may be provided instead of plane 25.

Figure 5:
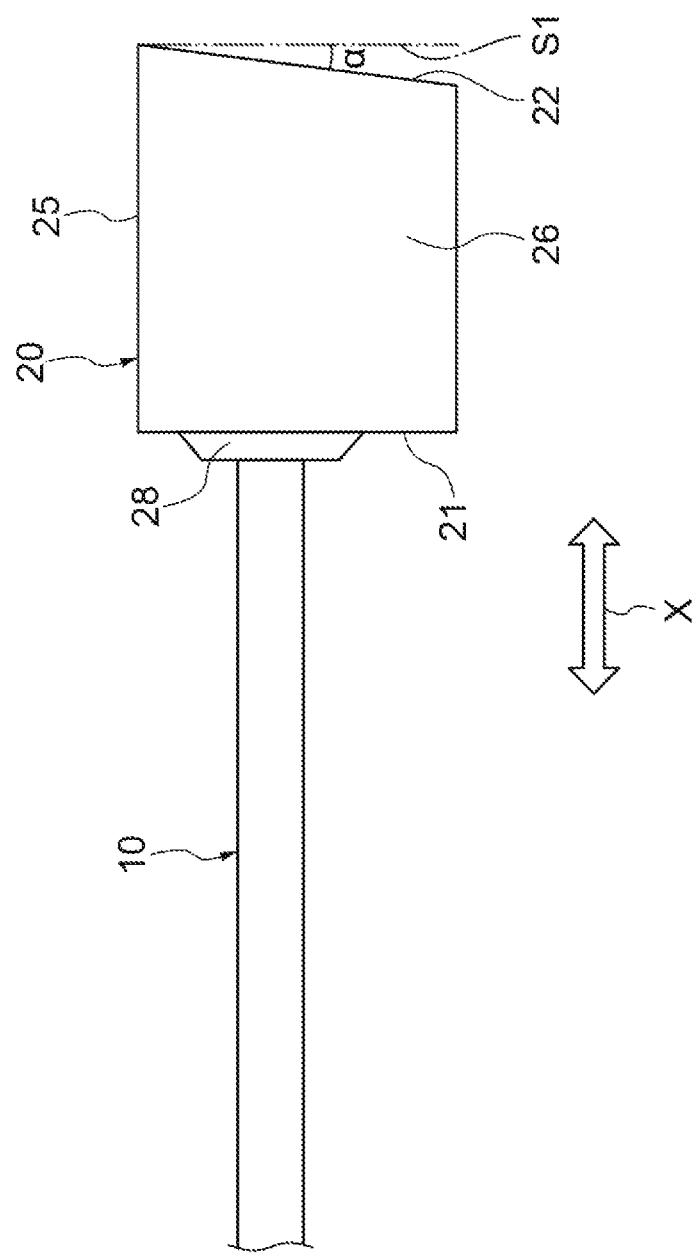
FIG. 5 is a side view showing the end portion of the optical connection component of FIG. 4 viewed from a direction parallel to a plane of a capillary.

FIG. 5 is a side view showing the end portion of optical connection component 1 viewed from a direction parallel to plane 25 of capillary 20. Second end face 22 is a flat surface facing first end face 21 in the direction X. Second end face 22 is inclined at an angle α with respect to a virtual plane S1 perpendicular to the direction X. Second end face 22 is inclined so as to approach first end face 21 as it goes away from plane 25. The angle α is an acute angle and its magnitude may be 8°. The maximum distance between second end face 22 and first end face 21 may be 1.5 mm or less. Here, the maximum distance is the maximum value of the distance along the direction X between first end face 21 and second end face 22. In the present embodiment, since second end face 22 is inclined so as to approach first end face 21 as it goes away from plane 25, the distance between portions connected by plane 25 is the maximum distance.

Figure 6:
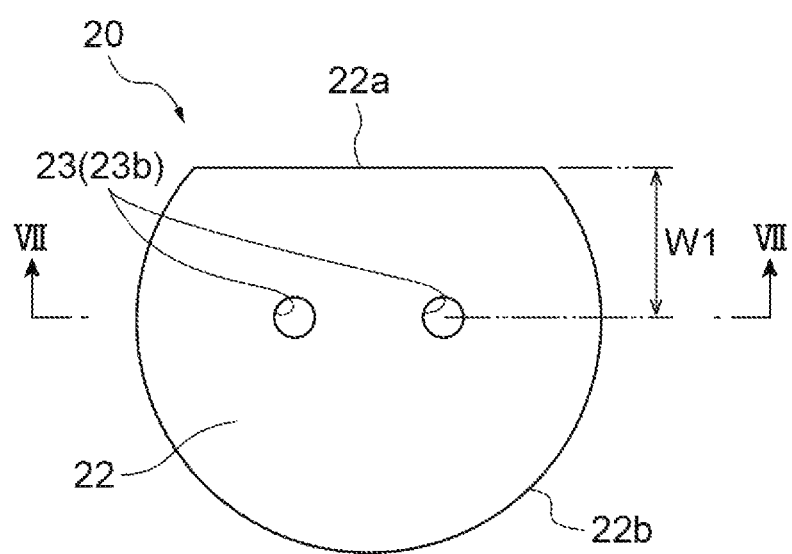
FIG. 6 is a front view showing the capillary shown in FIG. 4 viewed from a second end face side.

FIG. 6 is a front view showing capillary 20 included in optical connection component 1 as viewed from second end face 22 side. An outer edge of second end face 22 is defined by chord 22a and arc 22b. Both ends of arc 22b are connected to both ends of chord 22a, respectively. Arc 22b is an arc larger than the circumference of a semicircle. Second end face 22 is provided with openings of the pair of receiving holes 23. The openings of the pair of receiving holes 23 are provided side by side along an extending direction of chord 22a. Also, each center of the openings of receiving holes 23 is located at a distance W1 from chord 22a. The distance W1 may be 10 µm or less or 3 µm or less.

Figure 7:
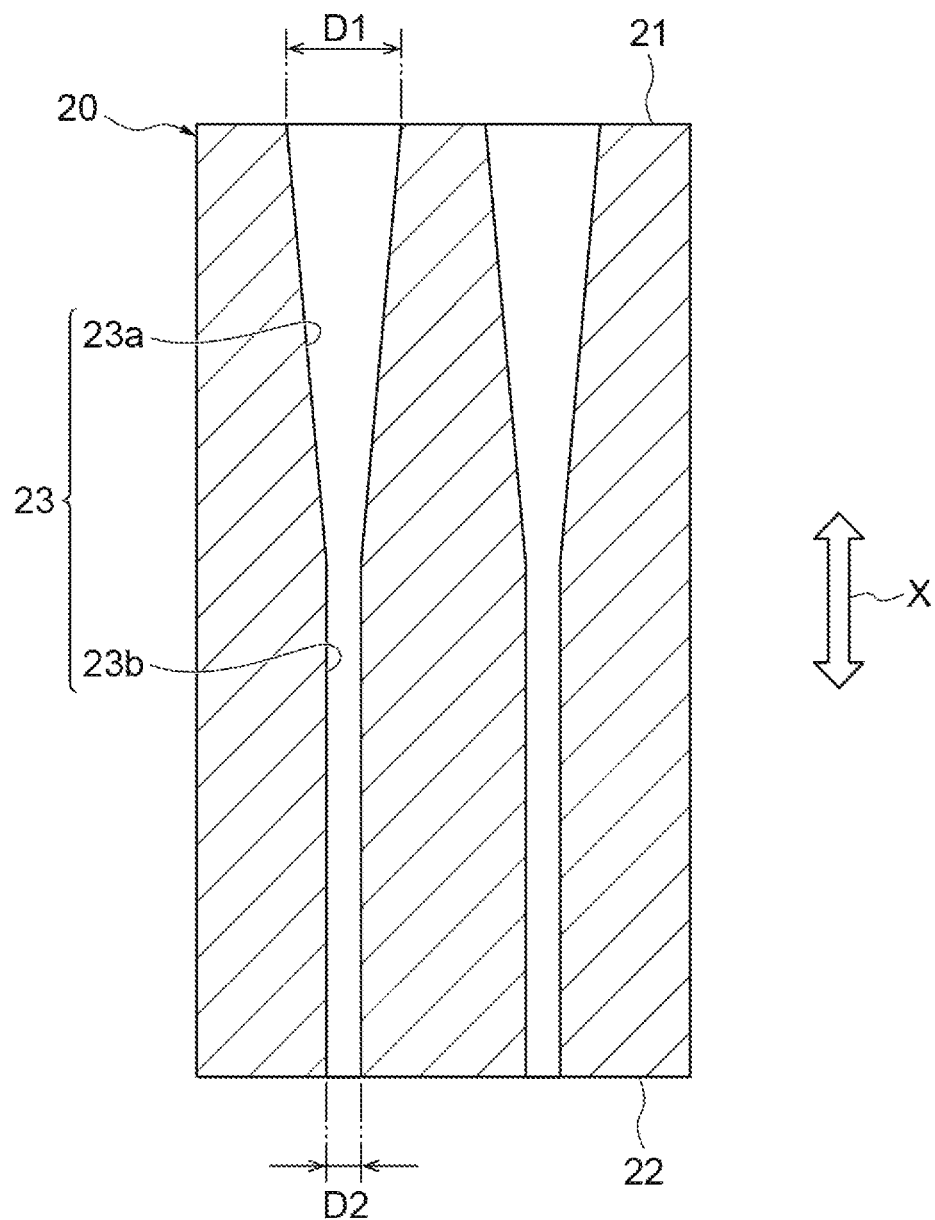
FIG. 7 is a cross-sectional view schematically showing a cross section taken along line VII-VII shown in FIG. 6.

FIG. 7 is a cross-sectional view schematically showing a cross section of capillary 20 taken along line VII-VII shown in FIG. 6. The pair of receiving holes 23 are through holes provided from first end face 21 toward second end face 22 along the direction X. Each end portion of optical fibers 10 is received in each of receiving holes 23. The number of receiving holes 23 corresponds to the number of optical fibers 10, and two receiving holes 23 are provided in this embodiment. Each receiving hole 23 has a first portion 23a and a second portion 23b.

First portion 23a is provided closer to first end face 21 than second portion 23b. First portion 23a is a hole having one end opened at first end face 21 and the other end connected to second portion 23b. A cross section obtained by cutting first portion 23a by a plane perpendicular to the direction X has a circular shape. The one end of first portion 23a on first end face 21 side (an opening at first end face 21) has an inner diameter D1. On the other hand, the other end of first portion 23a on second end face 22 side has an inner diameter D2 which is the same size as an inner diameter of second portion 23b. Inner diameter D1 is larger than inner diameter D2. First portion 23a has a tapered shape. Thus, the inner diameter of first portion 23a gradually decreases from first end face 21 side toward second end face 22 side.

Second portion 23b is provided closer to second end face 22 than first portion 23a. Second portion 23b is a hole having one end connected to first portion 23a and the other end opened at second end face 22. A cross section obtained by cutting second portion 23b by a plane perpendicular to the direction X has a circular shape. Second portion 23b is a straight hole having a constant inner diameter D2 in any portion. Inner diameter D2 is larger than the outer diameter of coating removed portion 12 of optical fiber 10 (i.e., the outer diameter of the glass fiber). Inner diameter D2 may be 124 µm or more.

The shape of receiving holes 23 is not limited to the shape described above. The inner diameter of receiving holes 23 may be constant throughout in the direction X. Further, receiving holes 23 may be a straight through hole in which only a portion near the opening in first end face 21 is tapered and the inner diameter of the other portion is constant.

Figure 8:
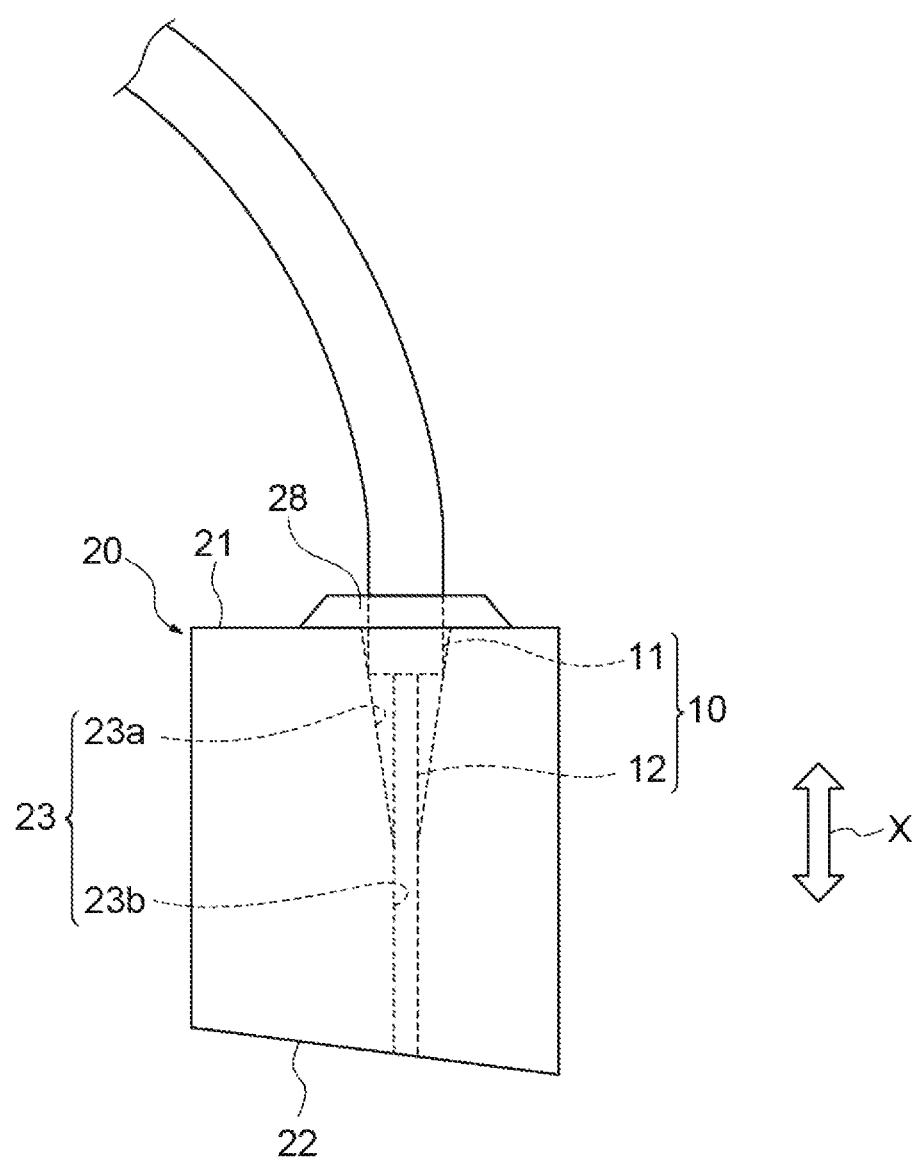
FIG. 8 is a conceptual diagram showing a state in which one of optical fibers is received in one of receiving holes of the capillary shown in FIG. 4.

FIG. 8 is a conceptual diagram showing a state in which one of optical fibers 10 is received in one of receiving holes 23 of capillary 20. In FIG. 8, receiving hole 23 and optical fiber 10 inside capillary 20 are indicated by broken lines. The end portion of optical fiber 10 is received in receiving hole 23 from the opening of first portion 23a provided on first end face 21 toward the opening of second portion 23b provided on second end face 22. An end of coated portion 11 of optical fiber 10 is received in first portion 23a. In addition, whole of coating removed portion 12 of optical fiber 10 is received in receiving hole 23. The end face of coating removed portion 12 is polished together with second end face 22 and is inclined with respect to the plane (virtual plane S1 shown in FIG. 5) perpendicular to the direction X.

An adhesive (not shown) is provided in a gap between coating removed portion 12 of optical fiber 10 and an inner surface of receiving hole 23. The adhesive secures coating removed portion 12 of optical fiber 10 to the inner surface of receiving hole 23. The adhesive may be ultraviolet cured adhesive. A Young's modulus of the adhesive after curing may be greater than or equal to 100 MPa and less than or equal to 2000 MPa. A shear bond strength of the adhesive may be equal to or greater than 10 N/mm². The shear bond strength is measured according to the method specified in JIS K 6850. The adhesive may also be provided in a gap between coated portion 11 of optical fiber 10 and the inner surface of receiving hole 23.

A protective resin 28 is provided on first end face 21 of capillary 20. Protective resin 28 is provided to surround coated portion 11 of each optical fiber 10 and is in contact with the outer surface of coated portion 11. Protective resin 28 prevents a bending stress of optical fiber 10 from concentrating at a connection portion between first end face 21 of capillary 20 and the inner surface of receiving hole 23, that is, in the vicinity of the opening of receiving hole 23. A part of protective resin 28 may extend to the gap between the inner surface of receiving hole 23 and the outer surface of optical fiber 10 from the opening of receiving hole 23 provided in first end face 21. Protective resin 28 may have a Young's modulus smaller than the Young's modulus of the above mentioned adhesive after curing. The Young's modulus of protective resin 28 may be equal to or less than 100 MPa or may be equal to or less than 10 MPa.

Figure 9:
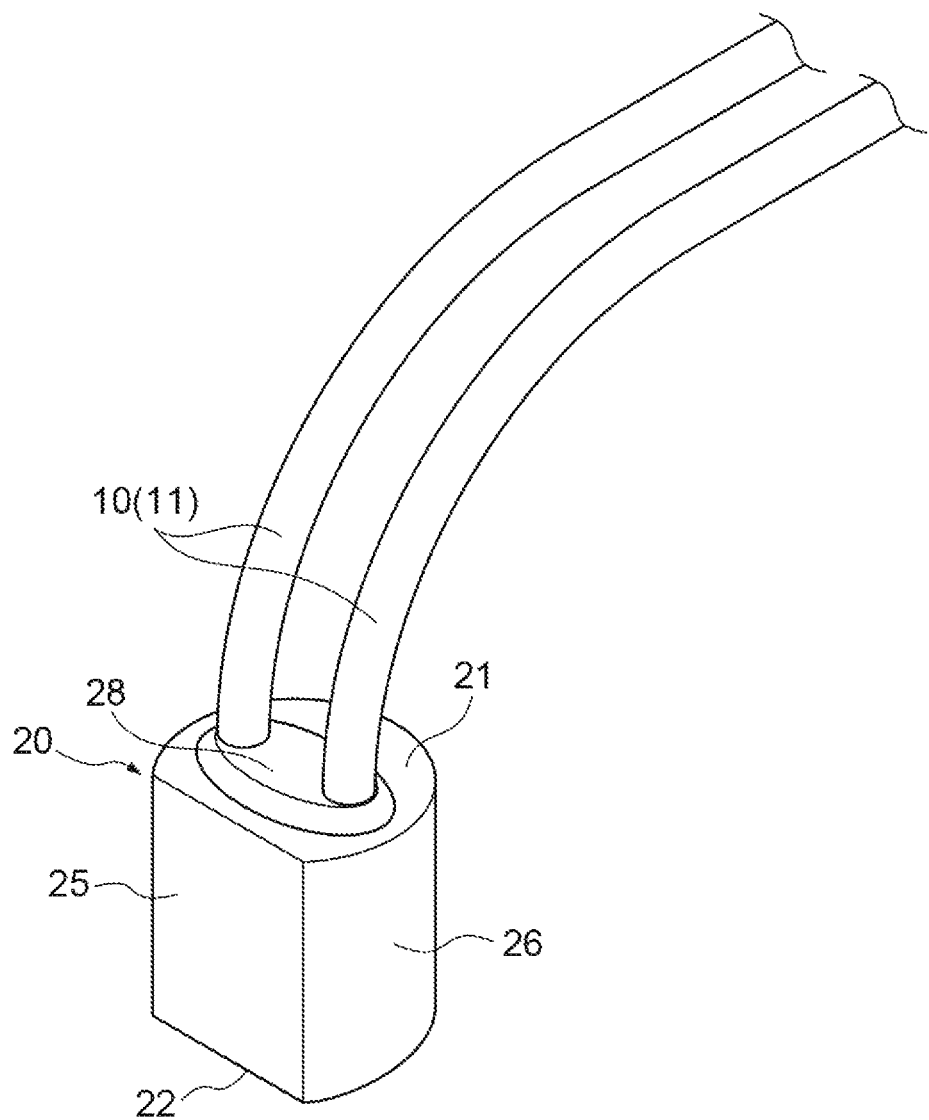
FIG. 9 is a perspective view showing a capillary and optical fibers with coated portions being bent.
Figure 10:
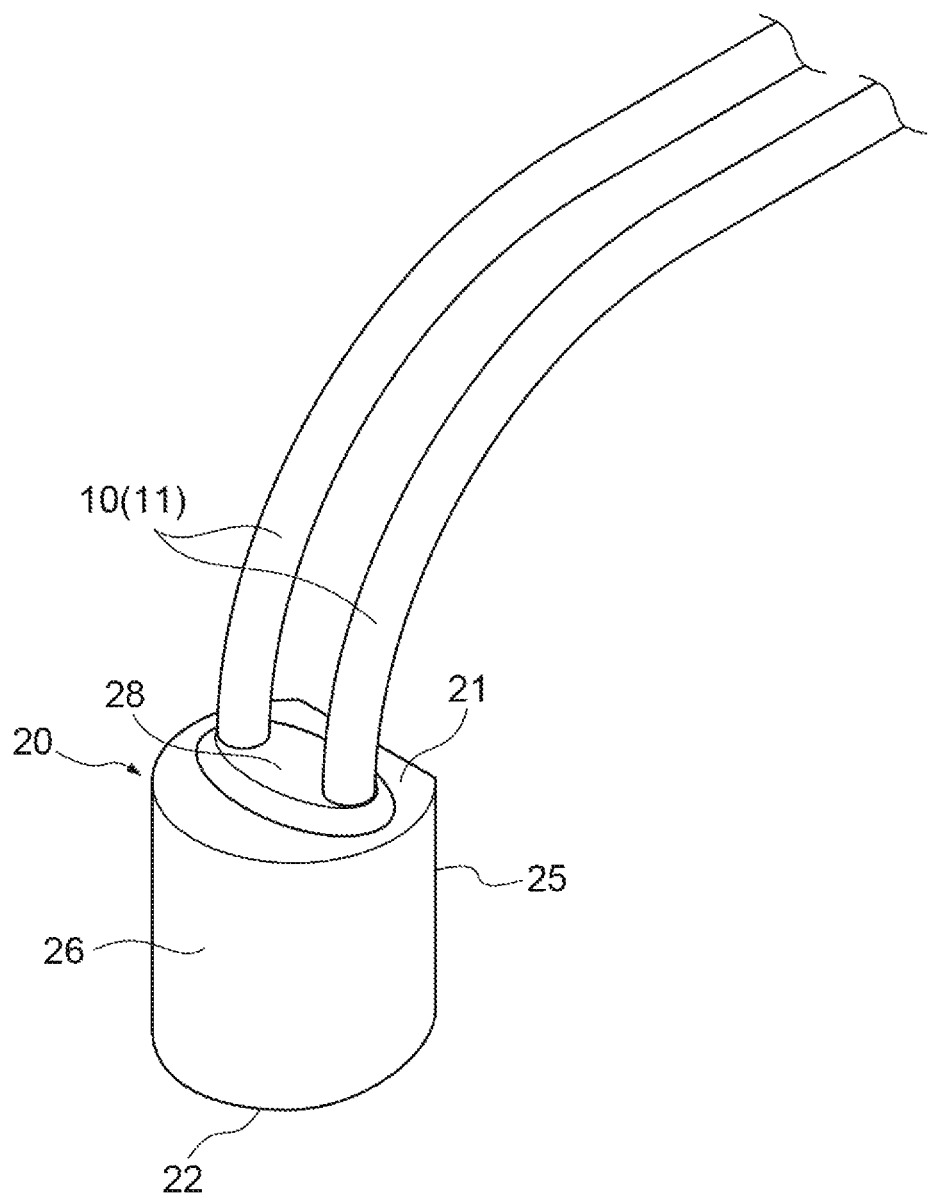
FIG. 10 is a perspective view showing a capillary and optical fibers with coated portions being bent in a direction different from that in FIG. 9.

FIG. 9 is a perspective view showing capillary 20 and optical fibers 10 with coated portions 11 being bent. FIG. 10 is a perspective view showing capillary 20 and optical fibers 10 with coated portions 11 being bent in a direction different from that in FIG. 9. As shown in FIGS. 9 and 10, a portion of coated portion 11 of each optical fiber 10 not received in capillary 20 can be bent. In the example shown in FIG. 9, optical fibers 10 are bent in a direction opposite to the direction of plane 25 of capillary 20. At this time, the bending radius of optical fibers 10 may be equal to or smaller than 3 mm. As shown in FIG. 10, optical fibers 10 can be bent in a direction in which plane 25 of capillary 20 faces.

In optical connection component 1 according to the present embodiment, the outer diameter of the glass fiber is less than 124 µm. Therefore, the outer diameter of the glass fiber included in optical fiber 10 is smaller than the outer diameter of the cladding of the standard optical fiber. As a result, stress generated in the glass fiber when optical fiber 10 is bent is reduced, so that the glass fiber is hardly damaged even when optical fiber 10 is largely bent. Therefore, optical connection component 1 can be disposed in a narrow space.

In the above embodiment, the outer diameter of the glass fiber may be 85 µm or less. According to this aspect, the glass fiber of optical fiber 10 is thinner. As a result, the stress generated in the glass fiber when optical fiber 10 is bent is further reduced, so that the glass fiber is hardly damaged even when optical fiber 10 is bent more largely. Therefore, optical connection component 1 can be disposed in a narrower space.

In the above embodiment, the inner surface of receiving hole of capillary 20 may be fixed to coating removed portion 12 of optical fiber 10 by the ultraviolet cured adhesive. This prevents capillary 20 from falling off optical fiber 10. The material of capillary 20 may be an ultraviolet-transmitting material. Accordingly, the ultraviolet cured adhesive positioned inside receiving holes 23 can be irradiated with ultraviolet rays from the outside of capillary 20, and thus the ultraviolet cured adhesive can be more reliably cured.

In the above embodiment, optical connection component 1 is provided with a protective resin 28 disposed on the first end face 21 of capillary 20, surrounding coated portion 11 of optical fiber 10, and contact with the outer surface of coated portion 11. As a result, it is possible to prevent the bending stress of optical fiber 10 from concentrating in the vicinity of the connection portion between first end face 21 of capillary 20 and the inner surface of receiving hole 23 (the opening portion of receiving hole 23), and thus, it is possible to suppress the damage of optical fiber 10.

In the above embodiment, a part of protective resin 28 may extend to the gap between the inner surface of receiving hole 23 and the outer surface of optical fiber 10. Accordingly, concentration of the bending stress of optical fiber 10 at the opening portion of receiving hole 23 can be more effectively prevented.

In the above embodiment, the Young's modulus of protective resin 28 may be smaller than the Young's modulus of the ultraviolet cured adhesive after curing. According to this aspect, protective resin 28 is more easily deformed by an external force than the ultraviolet cured adhesive after curing. Thus, since protective resin 28 does not largely prevent the deformation of optical fiber 10, optical fiber 10 can be easily bent in protective resin 28, and the concentration of bending stress of optical fiber 10 near the surface of protective resin 28 can be more effectively prevented.

In the above embodiment, each receiving hole 23 has first portion 23a extending from first end face 21 toward second end face 22 of capillary 20 and having the inner diameter that gradually decreases, and second portion 23b extending from first portion 23a toward second end face 22 and having the inner diameter that is constant. According to this aspect, inner diameter of the opening located on first end face 21 increases. Thus, coating removed portion 12 of optical fiber 10 can be easily received from the opening into receiving hole 23. In addition, the inner diameter of second portion 23b of receiving hole 23 where the distal end of optical fiber 10 is positioned becomes small. Thus, the optical axis shift of optical fiber 10 is reduced.

In the embodiment described above, the side surface of capillary 20 has the angle indicating portion indicating the azimuth of capillary 20 in the rotation direction around the central axis along which optical fibers 10 are received. This makes it possible to easily confirm the orientation of capillary 20 in the azimuth based on the angle indicating portion.

In the above embodiment, the side surface of capillary 20 includes plane 25 as the angle indicating portion parallel to the central axis, and cylindrical surface 26 continuous with plane 25 in the azimuth. This makes it possible to realize the angle indicating portion with a simpler configuration. In addition, the orientation of capillary 20 in the azimuth can be easily confirmed based on the position of plane 25 of the side surface of capillary 20.

In the above embodiment, the maximum distance between first end face 21 and second end face 22 may be 1.5 mm or less. According to this aspect, the length of capillary 20 with respect to the length of optical fibers 10 (the maximum distance between first end face 21 and second end face 22) becomes smaller. This makes it possible to widen a deformable range of optical fibers 10, thereby increasing the degree of freedom of wiring of optical fibers 10.

In the above embodiment, second end face 22 is inclined with respect to the plane (virtual plane S1) perpendicular to the optical axis of optical fibers 10 received in receiving holes 23. According to this aspect, the end faces of optical fibers 10 can be easily inclined together with second end face 22, and backward propagating light due to reflection at the end faces of optical fibers 10 can be reduced.

[First Modification]

Figure 11:
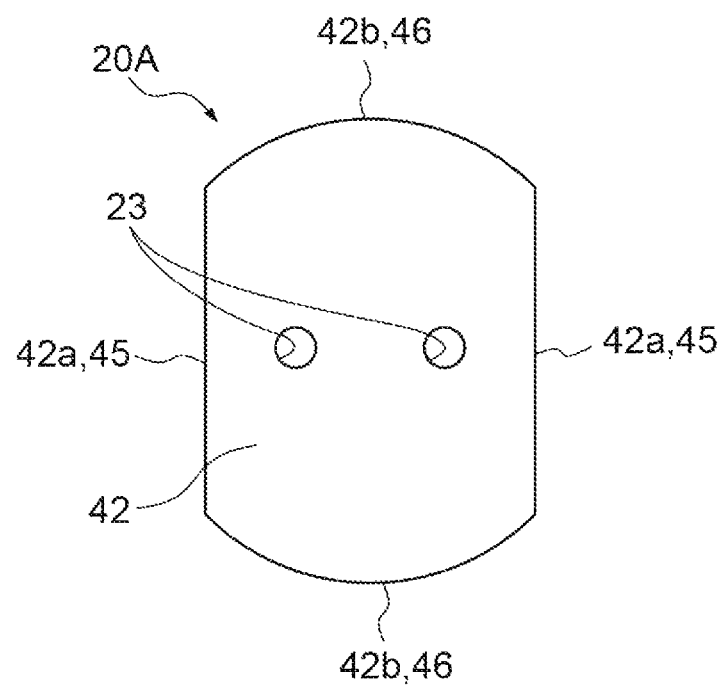
FIG. 11 is a front view showing a capillary according to a first modification viewed from a second end face side.

FIG. 11 is a front view showing a capillary 20A according to a first modification viewed from second end face 42 side. Capillary 20A is different from capillary 20 according to the above-described embodiment in that a pair of planes 45 are provided on the side surface. In the following description, differences from capillary 20 will be mainly described, and description of common points may be omitted.

Capillary 20A has a second end face 42 at its end portion. Capillary 20A has a first end face (not shown) having the same shape as second end face 42 at a position facing second end face 42. An outer edge of second end face 42 is defined by a pair of chords 42a and a pair of arcs 42b. From each chord 42a, plane 45 extends toward first end face side. The pair of planes 45 face each other. A cylindrical surface 46 extends from each arc 42b toward first end face side (back side of the paper). The pair of cylindrical surfaces 46 are opposed to each other. In capillary 20A according to the present modification, the side surface has plane 45 and cylindrical surface 46 having different shapes. Thus, the direction of capillary 20A can be easily confirmed. Further, capillary 20 can be easily held by pinching the pair of opposed planes 45 with fingers.

The side surface of capillary 20A may have three or more planes. For example, capillary 20A may have a quadrangular prism shape having four planes intersecting each other at right angles as side surfaces.

[Second Modification]

Figure 12:
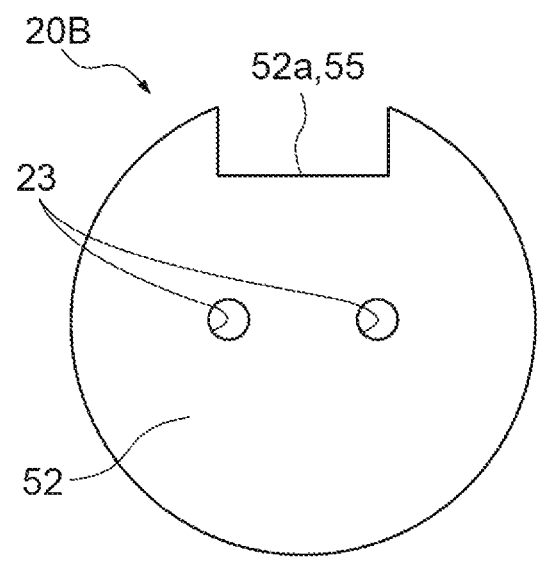
FIG. 12 is a front view showing a capillary according to a second modification viewed from a second end face side.

FIG. 12 is a front view showing a capillary 20B according to a second modification viewed from a second end face 52 side. Capillary 20B is different from capillary 20 according to the above-described embodiment in that it has a recess 55 on the side surface. In the following description, differences from capillary 20 will be mainly described, and description of common points may be omitted.

Capillary 20B has second end face 52 at its end portion. Capillary 20B has a first end face (not shown) having the same shape as second end face 52 at a position facing second end face 52. Second end face 52 has a recess 52a. Recess 55 extending from recess 52a of second end face 52 toward first end face is provided on the side surface of capillary 20B. Recess 55 is provided continuously along the receiving direction of optical fibers 10. Recess 55 functions as an angle indicating portion indicating the direction of capillary 20B in the azimuth around the central axis along which optical fibers 10 are received.

In capillary 20B according to this modification, recess 55 is provided as the angle indicating portion on the side surface. Thus, the direction of capillary 20B in the azimuth can be easily confirmed based on the position of recess 55.

The shape of recess 55 is not limited to the shape described above. For example, recess 55 may not be provided continuously from first end face to second end face 52, and may be provided intermittently or partially.

[Third Modification]

Figure 13:
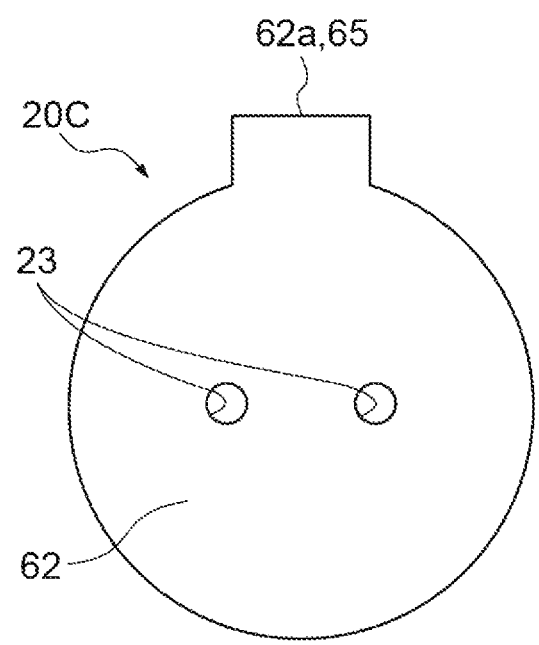
FIG. 13 is a front view showing a capillary according to a third modification viewed from a second end face side.

FIG. 13 is a front view showing a capillary 20C according to a third modification viewed from a second end face 62 side. Capillary 20C according to the third modification is different from capillary 20 in that a projection 65 is provided on the side surface. In the following description, differences from capillary 20 according to the above-described embodiment will be mainly described, and description of common points may be omitted.

Capillary 20C has second end face 62 at its end portion. Capillary 20C has a first end face (not shown) having the same shape as second end face 62 at a position facing second end face 62. Second end face 62 has a projection 62*a* projecting outward. The side surface of capillary 20C is provided with projection 65 extending from projection 62*a* of second end face 62 toward first end face. Projection 65 is provided continuously along the receiving direction of optical fibers 10. Projection 65 functions as an angle indicating portion that indicates the direction of capillary 20C in the azimuth around the central axis along which the receiving direction of optical fibers 10 extends.

In capillary 20C according to this modification, projection 65 is provided as the angle indicating portion on the side surface. Thus, the direction of capillary 20C in the azimuth can be easily confirmed based on the position of projection 65.

The shape of projection 65 is not limited to the shape described above. For example, projection 65 may not be provided continuously from first end face to second end face 62, and may be provided intermittently or partially.

Although embodiments of the present invention have been described in detail above, the present invention is not limited to the above embodiments and can be applied to various embodiments. For example, second end face 22 may be provided parallel to plane (virtual plane S1 in FIG. 5) perpendicular to the optical axis of optical fibers 10 received in receiving holes 23.

What is claimed is:

1. An optical connection component comprising:
    a plurality of optical fibers each including a glass fiber having an outer diameter of less than 124 µm and a resin coating covering the glass fiber, wherein each of the plurality of optical fibers is provided with a coated portion where the glass fiber is covered with the resin coating, and a coating removed portion where the glass fiber is exposed from the resin coating and that is located closer to an end face of each of the plurality of optical fibers than the coated portion;
    a capillary having a first end face and a second end face opposing to each other, the capillary having a plurality of holes, each of the plurality of holes having an opening at the first end face, extending towards the second end face, and receiving the coating removed portion of each of the plurality of optical fibers,
    wherein the capillary is made of a material to be transparent to ultraviolet light, and the coating removed portion is adhered to an inner surface of the plurality of holes with ultraviolet cured adhesive; and
    a protective resin disposed on the first end face and surrounding the coated portion and contacting an outer surface of the coated portion, wherein a Young's modulus of the protective resin is smaller than a Young's modulus of the ultraviolet cured adhesive.

2. The optical connection component according to claim 1, wherein the outer diameter of the glass fiber is equal to or less than 85 µm.

3. The optical connection component according to claim 1, further comprising:
    a protective resin disposed so as to surround the coated portion on the first end face and contact an outer surface of the coated portion.

4. The optical connection component according to claim 3, wherein a part of the protective resin extends to a gap between an inner surface of each of the plurality of holes and an outer surface of each of the plurality of optical fibers.

5. The optical connection component according to claim 1, wherein each of the plurality of holes has a first portion extending from the first end face toward the second end face and gradually reducing in inner diameter, and a second portion extending from the first portion toward the second end face and having a constant inner diameter.

6. The optical connection component according to claim 1, wherein the capillary has a side surface connecting the first end face and the second end face, and the side surface has an angle indicating portion indicating an azimuth of the capillary in a rotational direction around a central axis along which the plurality of optical fibers are received.

7. The optical connection component according to claim 6, wherein the side surface of the capillary includes a plane as the angle indicating portion parallel to the central axis.

8. The optical connection component according to claim 7, wherein the side surface of the capillary includes a cylindrical surface continuous with the plane in a rotation direction around the central axis.

9. The optical connection component according to claim 7, wherein the plane connects the first end face and the second end face.

10. The optical connection component according to claim 6, wherein the side surface of the capillary includes a pair of planes facing each other as the angle indicating portion parallel to the central axis.

11. The optical connection component according to claim 6, wherein the angle indicating portion includes at least one of a recess and a projection provided on the side surface.

12. The optical connection component according to claim 11, wherein at least one of the recess and the projection is provided continuously, intermittently or partially from the first end face to the second end face.

13. The optical connection component according to claim 1, wherein a maximum distance between the first end face and the second end face is 1.5 mm or less.

14. The optical connection component according to claim 1, wherein the second end face is inclined with respect to a plane perpendicular to optical axes of the plurality of optical fibers received in the plurality of holes.

15. The optical connection component according to claim 14, wherein the end face of each of the plurality of optical fibers is inclined together with the second end face.

16. The optical connection component according to claim 1, further comprising:
    a plurality of receptacles, each of the plurality of receptacles receiving an external optical connector and being attached to an end portion of each of the optical fibers on a side where the capillary is not attached.

* * * * *